US011789121B2

United States Patent
Schmalenberg

(10) Patent No.: US 11,789,121 B2
(45) Date of Patent: Oct. 17, 2023

(54) DETERMINING AN ANGLE OF AN INCIDENT BEAM OF COHERENT LIGHT

(71) Applicant: Toyota Motor Engineering & Manufacturing North America, Inc., Plano, TX (US)

(72) Inventor: Paul Donald Schmalenberg, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 401 days.

(21) Appl. No.: 16/885,564

(22) Filed: May 28, 2020

(65) Prior Publication Data
US 2021/0373130 A1    Dec. 2, 2021

(51) Int. Cl.
*G01S 7/48* (2006.01)
*G01S 7/481* (2006.01)
(Continued)

(52) U.S. Cl.
CPC .......... *G01S 7/4808* (2013.01); *G01S 7/4816* (2013.01); *G01S 17/10* (2013.01); *G01S 17/89* (2013.01)

(58) Field of Classification Search
CPC ...... G01S 7/4817; G01S 17/89; G01S 7/4818; G01S 17/42; G01S 17/10; G01S 17/931;
(Continued)

(56) References Cited

U.S. PATENT DOCUMENTS

| 9,753,351 B2 | 9/2017 | Eldada |
| 2018/0107091 A1 | 4/2018 | Hosseini et al. |
(Continued)

FOREIGN PATENT DOCUMENTS

| CN | 206515471 U | 9/2017 |
| JP | 2020027305 A | 2/2020 |
| WO | 2019054939 A1 | 3/2019 |

OTHER PUBLICATIONS

Fatemi et al., "High sensitivity active flat optics optical phased array receiver with a two-dimensional aperture," Nov. 12, 2018, vol. 26, No. 23, Optics Express, 17 pages.
(Continued)

*Primary Examiner* — Farhan Mahmud
(74) *Attorney, Agent, or Firm* — Christopher G. Darrow; Darrow Mustafa PC

(57) ABSTRACT

A system can determine an angle of an incident beam of a coherent light. An optical antenna, first waveguides, a manifold, and second waveguides can be fabricated on a first chip. Pixels can be fabricated on a second chip. The first chip and the second chip can be mounted on a printed circuit board. The optical antenna can be configured to receive the incident beam at an angle with respect to a plane defined by the optical antenna. The first waveguides can be configured to convey first channels of the coherent light from the optical antenna. The manifold can be configured to receive the first channels of the coherent light from the first waveguides. The second waveguides can be configured to convey second channels of the coherent light from the manifold. The pixels can be configured to receive the second channels of the coherent light from the second waveguides.

20 Claims, 8 Drawing Sheets

(51) Int. Cl.
*G01S 17/10* (2020.01)
*G01S 17/89* (2020.01)

(58) Field of Classification Search
CPC ...... G01S 7/4815; G01S 7/4863; G01S 17/08; G01S 7/4812; G01S 17/66; G02B 6/34; G02B 27/0172; G02B 6/124; G02B 6/0016
See application file for complete search history.

(56) References Cited

U.S. PATENT DOCUMENTS

| | | |
|---|---|---|
| 2019/0056270 A1 | 2/2019 | Cabib |
| 2019/0165485 A1 | 5/2019 | Hand et al. |
| 2019/0391243 A1 | 12/2019 | Nicolaescu |
| 2020/0018917 A1 | 1/2020 | De Vido |
| 2020/0049923 A1 | 2/2020 | Goodale et al. |
| 2020/0256958 A1* | 8/2020 | Piggott ................ G01S 17/894 |

OTHER PUBLICATIONS

Cherukara et al., "Real-time coherent diffraction inversion using deep generative networks," Sci Rep 8, 16520, pp. 1-8, Nov. 8, 2018.
Katumba et al., "Neuromorphic Computing Based on Silicon Photonics", IEEE Journal of Selected Topics in Quantum Electronics, Dec. 2018, vol. 24 No 6, 10 pages.
Unknown, "Wave interference," https://en.wikipedia.org/wiki/Wave_interference (Last accessed May 19, 2020, 10 pages).

* cited by examiner

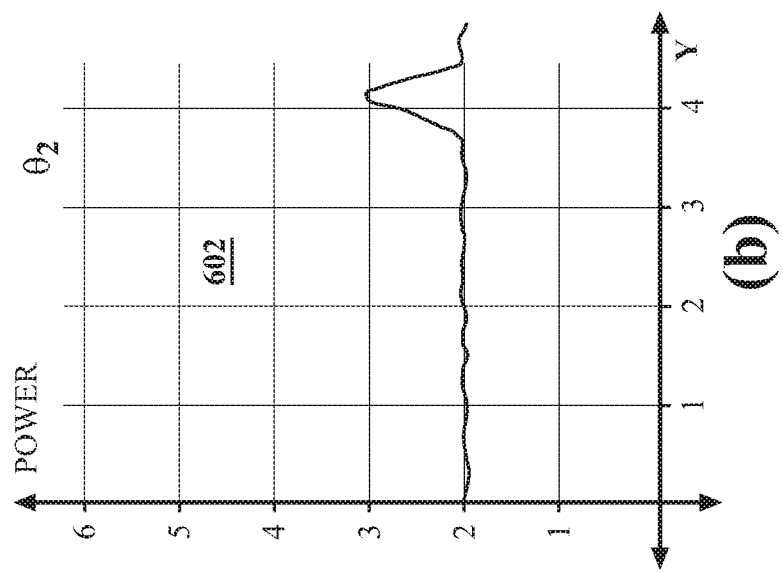
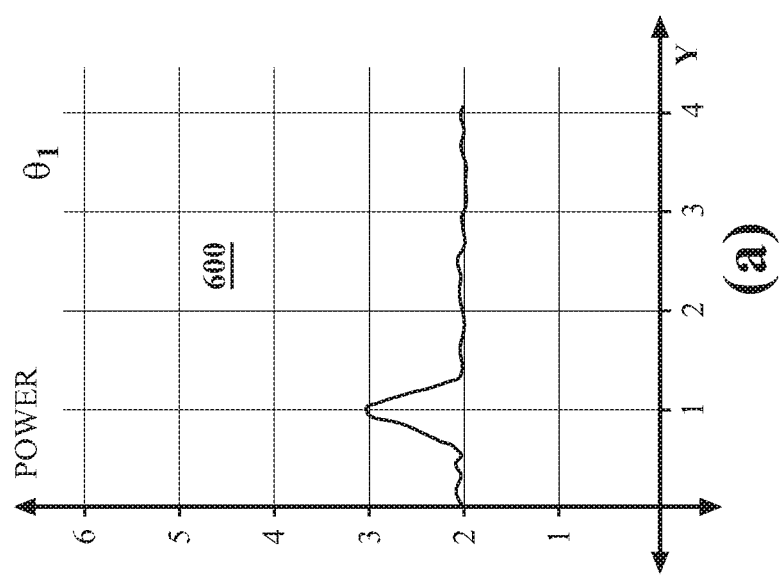
FIG. 6

DETERMINING AN ANGLE OF AN INCIDENT BEAM OF COHERENT LIGHT

TECHNICAL FIELD

The disclosed technologies are directed to determining an angle of an incident beam of a coherent light. Specifically, the disclosed technologies are directed to determining an angle of an incident beam of a coherent light on an optical antenna of a system used to calibrate a source of the coherent light.

BACKGROUND

An autonomous vehicle can use a light detection and ranging (LIDAR) system to perform several functions including, for example, localization, map generation, and obstacle avoidance. The LIDAR system can include a laser. The LIDAR system can cause the laser to emit pulses of a coherent light. Beams of the coherent light can be reflected from points on objects that surround the autonomous vehicle. The LIDAR system can measure times of flight between emissions of the pulses and receptions of the beams reflected from the points. Distances between the autonomous vehicle and the objects can be determined from the times of flight. A coordinate system for each point can include a first coordinate that defines a position of the point with respect to the autonomous vehicle and a second coordinate that defines a distance between the autonomous vehicle and the point. A set of coordinates for the points can be referred to as a point cloud. The point cloud can be a representation of the objects that surround the autonomous vehicle. An accuracy of the representation can be a function of an accuracy of a knowledge of an angle at which a beam of the coherent light, reflected from a point, is incident upon the LIDAR system.

SUMMARY

In an embodiment, a system for determining an angle of an incident beam of a coherent light can include an optical antenna, first waveguides, a manifold, second waveguides, and pixels. The first waveguides can be communicably coupled to the optical antenna. The manifold can be communicably coupled to the first waveguides. The second waveguides can be communicably coupled to the manifold. The pixels can be communicably coupled to the second waveguides. The optical antenna, the first waveguides, the manifold, and the second waveguides can be fabricated on a first chip. The pixels can be fabricated on a second chip. The first chip and the second chip can be mounted on a printed circuit board.

In another embodiment, a method for determining an angle of an incident beam of a coherent light can include receiving, by an optical antenna, the incident beam at the angle. The angle can be with respect to a plane defined by a surface of the optical antenna. The method can include conveying first channels of the coherent light away from the optical antenna to a manifold. The method can include allowing, within the manifold, one of the first channels of the coherent light to interfere with another of the first channels of the coherent light. The method can include conveying second channels of the coherent light away from the manifold to an array of pixels. The method can include determining the angle of the incident beam from an analysis of a distribution of a power across the array.

In another embodiment, a method of making a device for determining an angle of an incident beam of a coherent light can include forming an optical antenna on or within a bulk substrate. The method can include forming a manifold on or within the bulk substrate. The method can include forming first waveguides on or within the bulk substrate. The first waveguides can be communicably coupled between the optical antenna and the manifold. The method can include forming second waveguides on or within the bulk substrate. The second waveguides can be communicably coupled to the manifold.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 6 are graphs of second examples of distributions of power across the array of pixels produced by the first alternative implementation of the manifold.

DETAILED DESCRIPTION

The disclosed technologies are directed to determining an angle of an incident beam of a coherent light. A light detection and ranging (LIDAR) system can cause a laser to emit pulses of the coherent light. Beams of the coherent light can be reflected from points on objects that surround the LIDAR system. A coordinate system for each point can include a first coordinate that defines a position of the point with respect to the LIDAR system and a second coordinate that defines a distance between the LIDAR system and the point. A set of coordinates for the points can be referred to as a point cloud. The point cloud can be a representation of the objects that surround the LIDAR system. An accuracy of the representation can be a function of an accuracy of a knowledge of the angle at which a beam of the coherent light, reflected from a point, is incident upon the LIDAR system (i.e., the angle of the incident beam).

A device for determining the angle can include an optical antenna, first waveguides, a manifold, second waveguides, and pixels. The optical antenna can be configured to receive an incident beam of the coherent light at the angle. The coherent light can be conveyed from the optical antenna to the manifold by the first waveguides. In the manifold, the coherent light that emerges from one of the first waveguides can interfere with the coherent light that emerges from another of the first waveguides. The coherent light can be conveyed from the manifold to the pixels by the second waveguides. The pixels can be configured to measure a power of the coherent light that emerges from the second waveguides. The angle can be determined from an analysis of a distribution of the power measured by the pixels.

Figure 1:
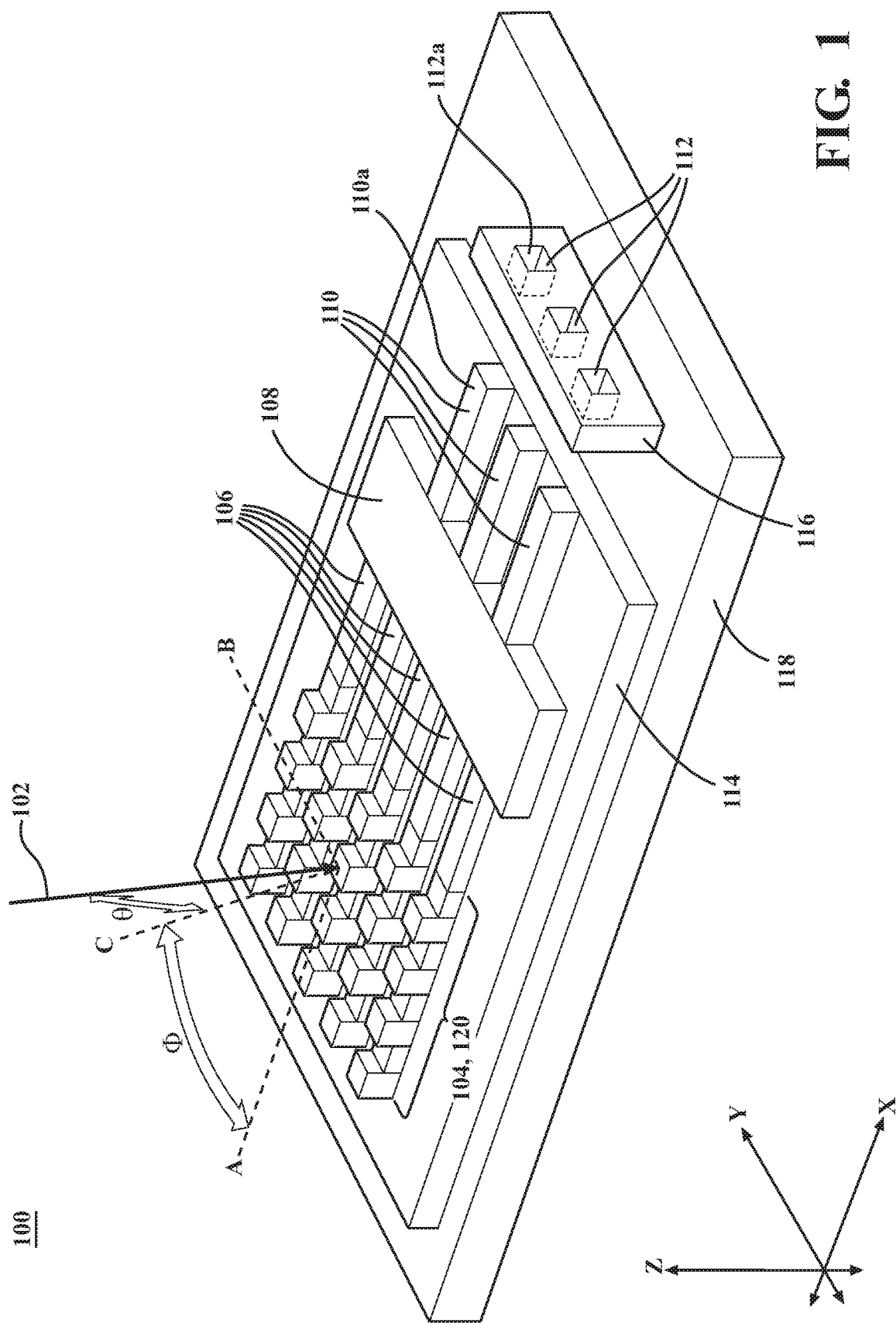
FIG. 1 is a diagram that illustrates an example of a device for determining an angle of an incident beam of a coherent light, according to the disclosed technologies.

FIG. 1 is a diagram that illustrates an example of a device 100 for determining an angle of an incident beam 102 of a coherent light, according to the disclosed technologies. The device 100 can include, for example, an optical antenna 104, first waveguides 106, a manifold 108, second waveguides 110, and pixels 112. The first waveguides 106 can be communicably coupled to the optical antenna 104. The manifold 108 can be communicably coupled to the first waveguides 106. The second waveguides 110 can be communicably coupled to the manifold 108. The pixels 112 can be communicably coupled to the second waveguides 110. The optical antenna 104, the first waveguides 106, the manifold 108, and the second waveguides 110 can be fabricated on a first chip 114. The pixels 112 can be fabricated on a second chip 116. The first chip 114 and the second chip 116 can be mounted on a printed circuit board 118. In an implementation, the second chip 116 can be the first chip 114. Alternatively, the first chip 114 can be more than one chip. One or more of the first chip 114 or the second chip 114 can be, for example, a photonics chip. For example, the optical antenna 104, the first waveguides 106, the manifold 108, and the second waveguides 110 can be fabricated as structures on or within a bulk substrate. The structures can be made of a material having a first refractive index. The bulk substrate can be made of a material having a second refractive index. The first refractive index can be greater than the second refractive index. For example the material having the first refractive index can be silicon or silicon nitride. For example, the material having the second refractive index can be silicon dioxide. Although FIG. 1 illustrates the optical antenna 104, the first waveguides 106, the manifold 108, and the second waveguides 110 as structures fabricated on the bulk substrate, one of skill in the art understands, in light of the description herein, that the optical antenna 104, the first waveguides 106, the manifold 108, and the second waveguides 110 can be fabricated as structures within the bulk substrate.

The optical antenna 104 can be configured to receive the incident beam 102 at a first angle $\theta$ and a second angle $\varphi$. The first angle $\theta$ can be with respect to a plane defined by a surface of the optical antenna 104. The second angle $\varphi$ can be with respect to a line defined by an edge of the optical antenna 104. The second angle $\varphi$ can be within the plane. For example, as illustrated in FIG. 1, the plane defined by the surface of the optical antenna 104 can include a line A, a line B, and a line C. The line A can be parallel to an x-axis. The line B can be parallel to a y-axis. The line C can be a projection of the ray of the incident beam 102 onto the surface of the optical antenna 104. A ray of the incident beam 102 can impinge upon the surface of the optical antenna 104 at a point at which the line A, the line B, and the line C intersect. The first angle $\theta$ can be formed between the ray of the incident beam 102 and the line C. The second angle $\varphi$ can be formed between the line C and the line A. (Alternatively, the second angle $\varphi$ can be formed between the line C and the line B.)

In an implementation, the optical antenna 104 can include spaced grating waveguides 120. For example, a spacing of the spaced grating waveguides 120 can be configured to cause, in response to a receipt of the incident beam 102 at the first angle $\theta$, a phase of the coherent light in one of the first waveguides 106 to be different from a phase of the coherent light in another of the first waveguides 106. For example: (1) a first ray of the incident beam 102 can impinge upon the surface of the optical antenna 104 at a first point and (2) a second ray of the incident beam 102 can impinge upon the surface of the optical antenna 104 at a second point. If the first angle $\theta$ is different from 90 degrees, then a phase difference can exist between the coherent light in the first ray at the first point and the coherent light in the second ray at the second point. Thus, the phase of the coherent light of the first ray coupled into the one of the first waveguides 106 can be different from the coherent light of the second ray coupled into the other of the first waveguides 106.

The first waveguides 106 can be configured to convey first channels of the coherent light away from the optical antenna 104. For example, as illustrated in FIG. 1, the first waveguides 106 can be configured to convey the first channels of the coherent light along the x-axis away from the optical antenna 104. In an implementation, a count of the first waveguides 106 can be a function of one or more of an antenna specification, an antenna gain, a grating lobe free scan area, or the like.

The manifold 108 can be configured to receive the first channels of the coherent light from the first waveguides 106. In an implementation, the manifold 108 can have a rectangular prism shape. For example, the manifold 108 can be configured so that a measure of a dimension of the manifold 108 along a path of a conveyance of the coherent light is greater than or equal to a minimal measure of the dimension that allows the coherent light that emerges from one of the first waveguides 106 to interfere with the coherent light that emerges from another of the first waveguides 106. For example, as illustrated in FIG. 1, the dimension of the manifold 108 along the path of the conveyance of the coherent light can be a dimension of the manifold 108 along the x-axis.

The second waveguides 110 can be configured to convey second channels of the coherent light away from the manifold 108. For example, as illustrated in FIG. 1, the second waveguides 110 can be configured to convey the second channels of the coherent light along the x-axis away from the manifold 108.

The pixels 112 can be configured to receive the second channels of the coherent light from the second waveguides 110. The pixels 112 can be disposed on an edge of the second chip 116. For example, the pixels 112 can be disposed orthogonal to the plane defined by the surface of the optical antenna 104. For example, as illustrated in FIG. 1, the pixels 110 can be disposed on the edge of the second chip 116 orthogonal to the plane defined by the x-axis and the y-axis.

In an implementation, the pixels 112 can be arranged in an array. The pixels 112 can be configured to measure a power of the coherent light that emerges from the second waveguides 110. For example, a pixel 112a, of the pixels 112, can be configured to measure a power of the coherent light that emerges from a corresponding second waveguide 110a of the second waveguides 110. In an implementation, a count of the second waveguides 110 can be equal to a count of the pixels 112. In an implementation, the count of the second waveguides 110 can be different from the count of the first waveguides 106.

Figure 2:
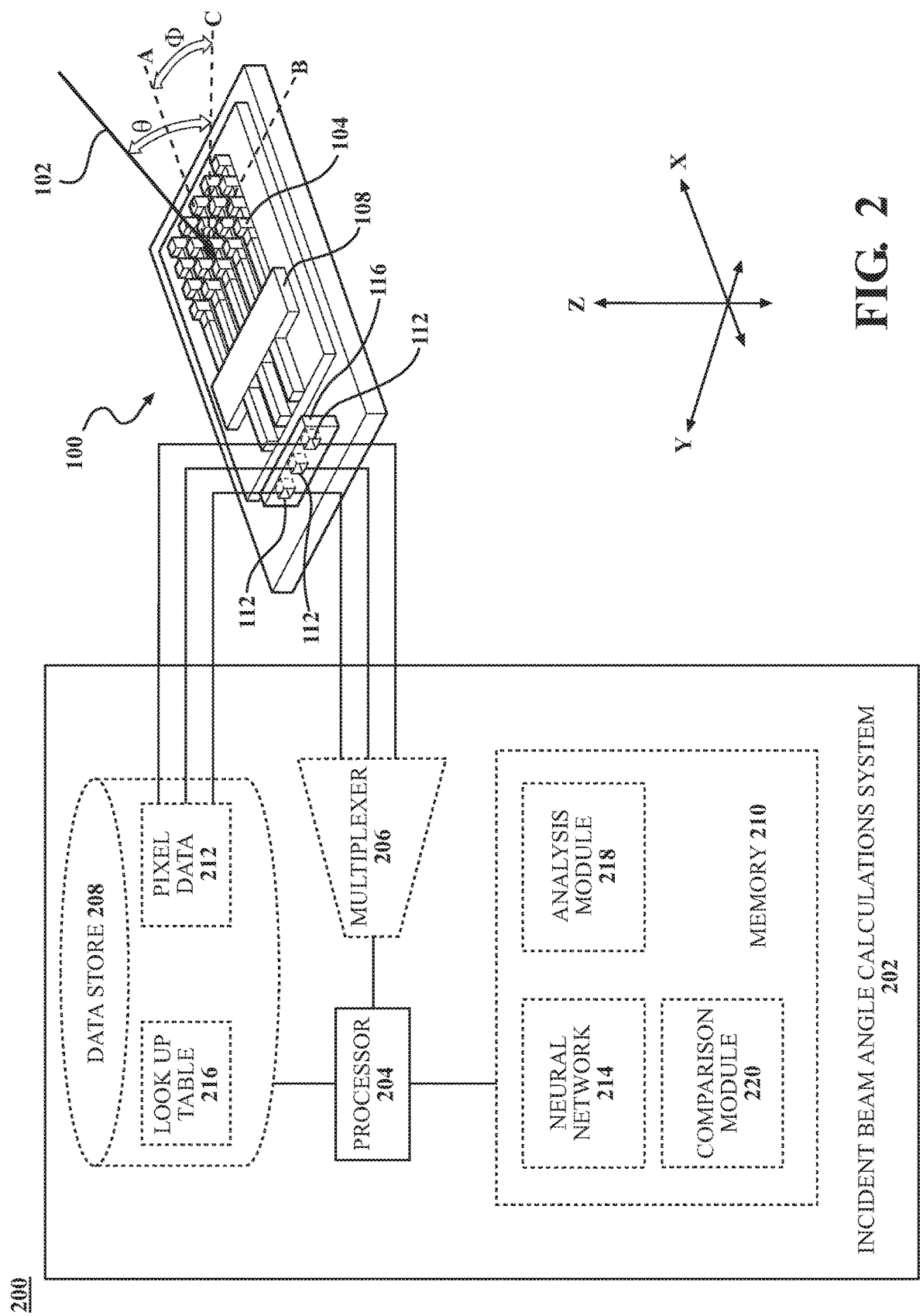
FIG. 2 is a block diagram that illustrates an example of a system for determining the angle of the incident beam of the coherent light, according to the disclosed technologies.

FIG. 2 is a block diagram that illustrates an example of a system 200 for determining the angle of the incident beam 102 of the coherent light, according to the disclosed technologies. The system 200 can include, for example, the device 100 and an incident beam angle calculations system 202. The incident beam angle calculations system 202 can include, for example, a processor 204. In an implementation, the incident beam angle calculations system 202 can include a multiplexer 206. The processor 204 can be communicably coupled to the multiplexer 206. In an implementation, the incident beam angle calculations system 202 can include a data store 208. The processor 204 can be communicably coupled to the data store 208. In an implementation, the incident beam angle calculations system 202 can include a memory 210. The processor 204 can be communicably coupled to the memory 210.

The multiplexer 206 can be configured to receive signals that indicate a power measured by the pixels 112 and to transmit a multiplexed signal to the processor 204. Additionally or alternatively, the data store 208 can store, for example, pixel data 212. The pixel data 212 can be data included in the signals that indicate the power measured by the pixels 112. For example, one of skill in the art understands, in light of the description herein, that an interface between the pixels 112 and the pixel data 212 can resemble an interface between pixels of a complementary metal-oxide-semiconductor (CMOS) image sensor (e.g., camera) and a memory that stores data captured by the pixels of the CMOS image sensor.

The processor 204 can be configured to determine the first angle θ of the incident beam 102 from an analysis of a distribution of the power across an array of the pixels 112.

In an implementation, the memory 210 can store a neural network 214. The processor 204 can be configured to operate the neural network 214. The neural network 214 can have been trained to determine the first angle θ. For example, the neural network 214 can have been trained by causing the incident beam 102 of the coherent light to impinge the optical antenna 104 at a known angle. For example, each pixel in the array of the pixels 112 can be an input for the neural network 214.

Additionally or alternatively: (1) the data store 208 can store, for example, a lookup table 216 and (2) the memory 210 can store, for example, an analysis module 218. The analysis module 218 can include instructions that function to control the processor 204 to analyze the distribution of the power across the array of pixels 112. The processor 204 can be configured to access values in the lookup table 216 in conjunction with a performance of the analysis of the distribution of the power across the array of the pixels 112. For example, the processor 204 can be configured to compare, for a pixel in the array of the pixels 112, a corresponding power measured by the pixel with one or more of the values in the lookup table 216.

Figure 3:
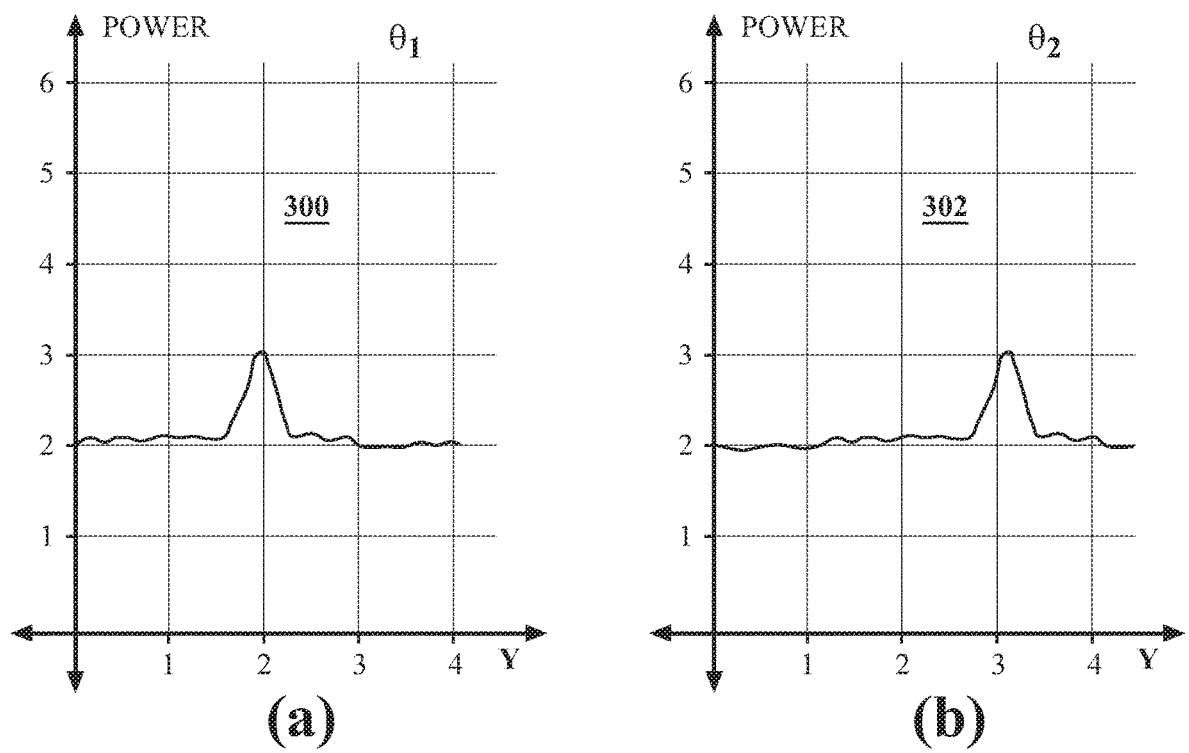
FIG. 3 are graphs of examples of distributions of power across an array of pixels.

FIG. 3 are graphs of examples of distributions of power across the array of the pixels 112. A view (a) of FIG. 3 is a graph 300 of a distribution of power across the array of the pixels 112 in response to the first angle θ having a first value $\theta_1$. The graph 300 has a peak power value of 3 at a point on the y-axis that has a value of 2. Generally, power values at points along the y-axis have values of 2. A view (b) of FIG. 3 is a graph 302 of a distribution of power across the array of the pixels 112 in response to the first angle θ having a second value $\theta_2$. The graph 302 has a peak value of 3 at a point on the y-axis that has a value of 3. Generally, power values at points along the y-axis have values of 2. One of skill in the art understands, in light of the description herein, that a quality of an information included in the distribution of the power across the array of the pixels 112 can increase as a count of the pixels 112 increases.

Returning to FIG. 2, in an implementation, the incident beam 102 can be time multiplexed so that the coherent light is at a first wavelength $\lambda_1$ and a second wavelength $\lambda_2$. The processor 204 can be further configured to determine the second angle φ based on a comparison of: (1) an analysis of the distribution of the power across the array associated with the coherent light at the first wavelength $\lambda_1$ with (2) an analysis of the distribution of the power across the array associated with the coherent light at the second wavelength $\lambda_2$. For example, the memory 210 can store a comparison module 220. The comparison module 220 can include instructions that function to control the processor 204 to compare: (1) the analysis of the distribution of the power across the array associated with the coherent light at the first wavelength $\lambda_1$ with (2) the analysis of the distribution of the power across the array associated with the coherent light at the second wavelength $\lambda_2$. For example, if the optical antenna 104 includes the spaced grating waveguides 120, then: (1) a ray of the incident beam 102 at the first wavelength $\lambda_1$ can be diffracted by the spaced grating waveguides 120 at a first angle and (2) a ray of the incident beam 102 at the second wavelength $\lambda_2$ can be diffracted by the spaced grating waveguides 120 at a second angle.

Figure 4:
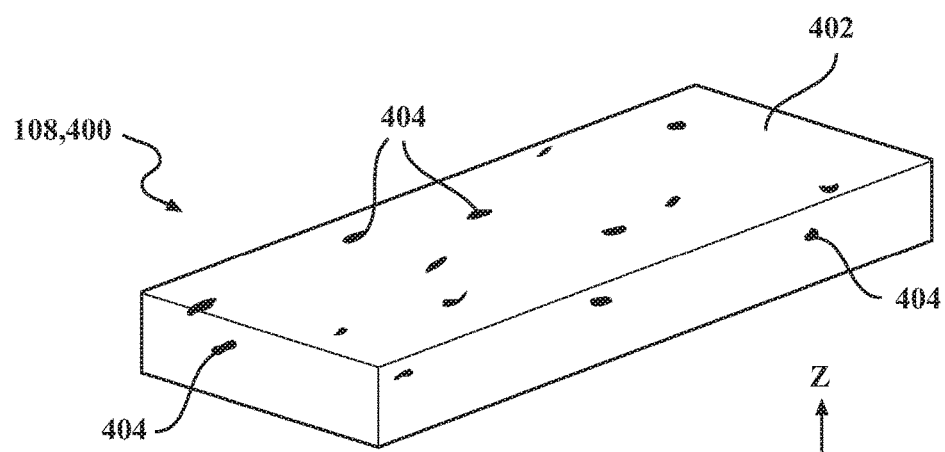
FIG. 4 is a diagram that illustrates a first alternative implementation of a manifold, according to the disclosed technologies.

FIG. 4 is a diagram that illustrates a first alternative implementation 400 of the manifold 108, according to the disclosed technologies. An interior 402 of the first alternative implementation 400 of the manifold 108 can include defects 404. The defects 404 can have various shapes, can have sizes that are a function of a wavelength of the coherent light, or both. The defects 404 can be disposed in a pseudorandom pattern. The pseudorandom pattern can be configured to cause, in response to a receipt of the coherent light, features in the distribution of the power across the array to be magnified so that the distribution of the power across the array for the first angle θ at the first value $\theta_1$ can be distinguishable from the distribution of the power across the array for the first angle θ at the second value $\theta_2$. In an implementation, the manifold 108 can be made of silicon and the defects 404 can be mad of silicon dioxide.

Figure 5:
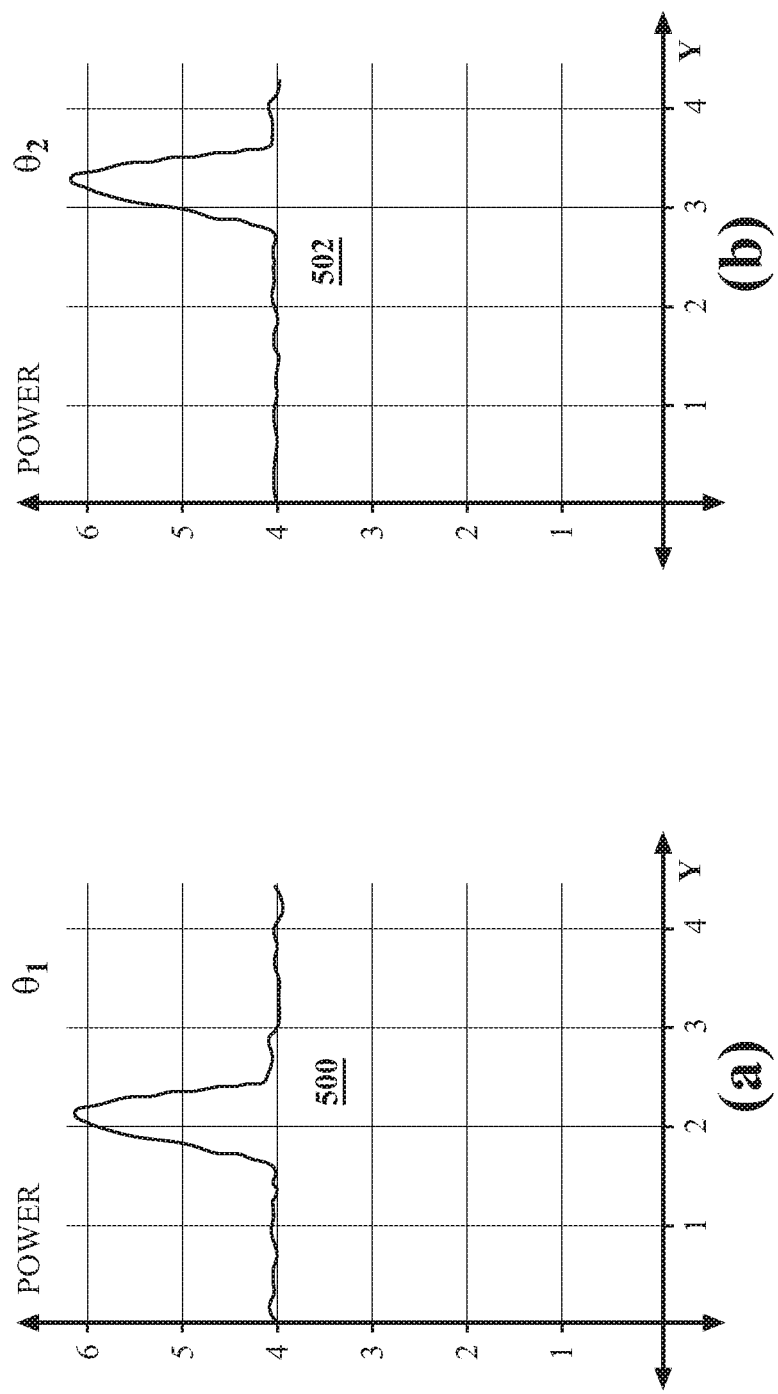
FIG. 5 are graphs of first examples of distributions of power across the array of pixels produced by the first alternative implementation of the manifold.

FIG. 5 are graphs of first examples of distributions of power across the array of pixels 112 produced by the first alternative implementation 400 of the manifold 108. A view (a) of FIG. 5 is a graph 500 of a distribution of power across the array of the pixels 112 in response to the first angle θ having the first value $\theta_1$. The graph 500 has a peak power value of 6 at a point on the y-axis that has a value of 2. Generally, power values at points along the y-axis have values of 4. A view (b) of FIG. 5 is a graph 502 of a distribution of power across the array of the pixels 112 in response to the first angle θ having the second value $\theta_2$. The graph 502 has a peak value of 6 at a point on the y-axis that has a value of 3. Generally, power values at points along the y-axis have values of 4. In comparison with the graphs illustrated in FIG. 3, the greater peak values in the graphs illustrated in FIG. 5 can better allow the distribution of the power across the array for the first angle θ at the first value $θ_1$ to be distinguishable from the distribution of the power across the array for the first angle θ at the second value $θ_2$.

FIG. 6 are graphs of second examples of distributions of power across the array of pixels 112 produced by the first alternative implementation 400 of the manifold 108. A view (a) of FIG. 6 is a graph 600 of a distribution of power across the array of the pixels 112 in response to the first angle θ having the first value $θ_1$. The graph 600 has a peak power value of 3 at a point on the y-axis that has a value of 1. Generally, power values at points along the y-axis have values of 2. A view (b) of FIG. 6 is a graph 602 of a distribution of power across the array of the pixels 112 in response to the first angle θ having the second value $θ_2$. The graph 602 has a peak value of 3 at a point on the y-axis that has a value of 4. Generally, power values at points along the y-axis have values of 2. In comparison with the graphs illustrated in FIG. 3, the greater distance between the peak values in the graphs illustrated in FIG. 6 can better allow the distribution of the power across the array for the first angle θ at the first value $θ_1$ to be distinguishable from the distribution of the power across the array for the first angle θ at the second value $θ_2$.

Figure 7:
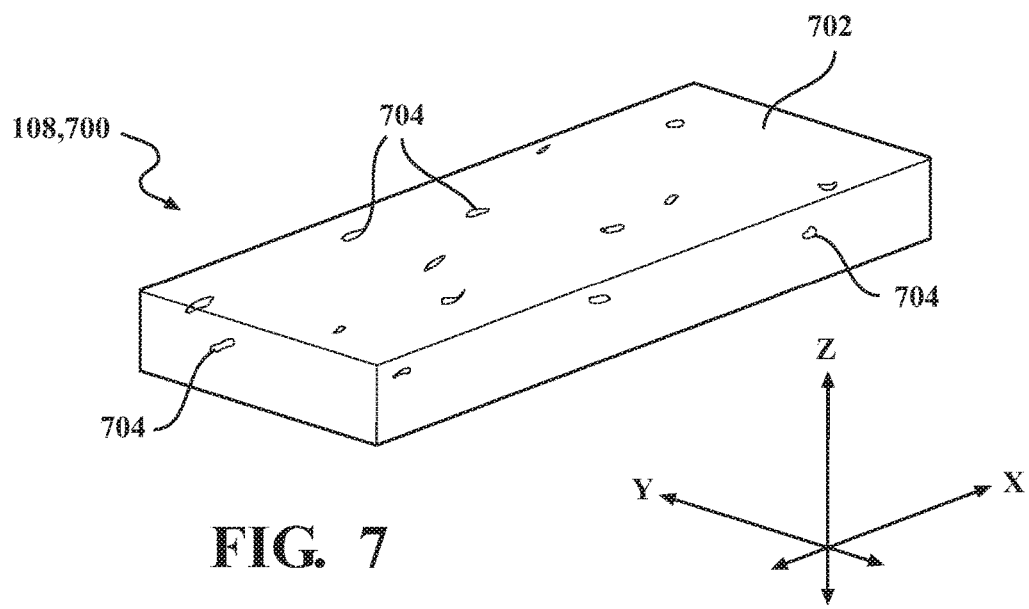
FIG. 7 is a diagram that illustrates a second alternative implementation of the manifold, according to the disclosed technologies.

FIG. 7 is a diagram that illustrates a second alternative implementation 700 of the manifold 108, according to the disclosed technologies. An interior 702 of the second alternative implementation 700 of the manifold 108 can include cavities 704. The cavities 704 can be disposed in a specific arrangement. The specific arrangement can be configured to cause, in response to a receipt of the coherent light that has a modulation pattern used to specifically identify a source of the coherent light, an amplification of the coherent light. Additionally, for example, the specific arrangement can be configured to prevent, in response to a receipt of the coherent light that lacks the modulation pattern used to specifically identify the source, the amplification of the coherent light.

For example, the source of the coherent light can be associated with a LIDAR system. The LIDAR system can be, for example, a specific model. A manufacturer can have manufactured a set of LIDAR systems such that each LIDAR system in the set is the specific model. However, each LIDAR system in the set can also have a specific identity. The modulation pattern can be used to specifically identify a LIDAR system in the set. For example, the manufacturer can manufacture a single specimen of the device 100 that includes the second alternative implementation 700 of the manifold 108 with a unique arrangement of the cavities 704. The manufacturer can test the single specimen of the device 100 to identify a modulation pattern that causes, in response to a receipt of the coherent light that has the modulation pattern, an amplification of the coherent light. The single specimen of the device 100 and a laser can be included in an individual LIDAR system. The individual LIDAR system can be configured to cause the laser to emit pulses of the coherent light that have the modulation pattern. In this manner, the modulation pattern can be used to specifically identify the source of the coherent light (i.e., the individual LIDAR system). (Moreover, if an individual autonomous vehicle includes the individual LIDAR system, then the modulation pattern can be used to specifically identify the individual autonomous vehicle.) The single specimen of the device 100, included in the individual LIDAR system, can be configured to receive, reflected from points on objects, beams of the coherent light that have the modulation pattern. The single specimen of the device 100 can be configured to cause, in response to a receipt of the coherent light that has the modulation pattern, an amplification of the coherent light.

Additionally, for example, the single specimen of the device 100 may receive coherent light that lacks the modulation pattern. For example, the single specimen 100 may receive the coherent light that lacks the modulation pattern from one or more other LIDAR systems (possibly associated with one or more other autonomous vehicles) that may be in a vicinity of the individual LIDAR system. The single specimen of the device 100 can be configured to prevent, in response to a receipt of the coherent light that lacks the modulation pattern, the amplification of the coherent light. Thus, the single specimen of the device 100 can be operated in a manner that mitigates an effect of interference from coherent light that lacks the modulation pattern (e.g., from the one or more other LIDAR systems that may be in the vicinity of the individual LIDAR system).

Figure 8:
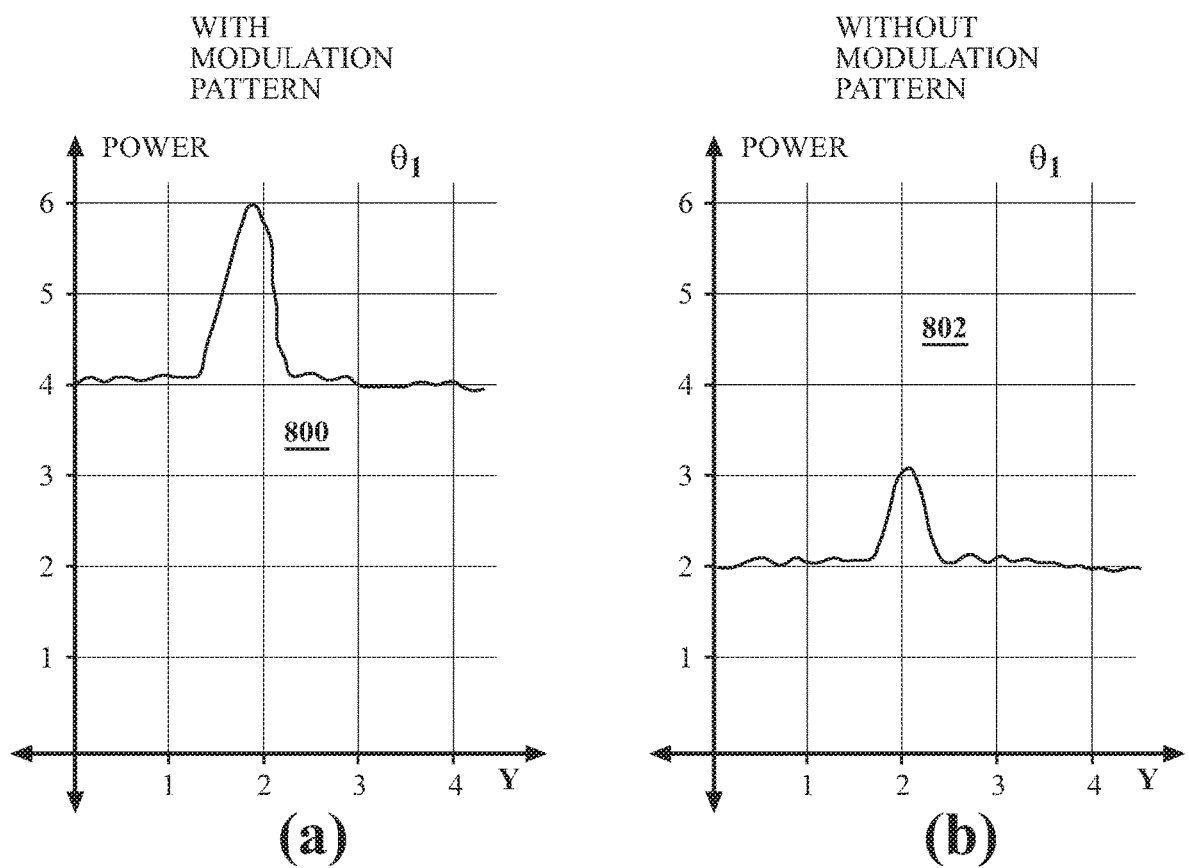
FIG. 8 are graphs of examples of distributions of power across the array of pixels produced by the second alternative implementation of the manifold.

FIG. 8 are graphs of examples of distributions of power across the array of pixels 112 produced by the second alternative implementation 700 of the manifold 108. A view (a) of FIG. 8 is a graph 800 of a distribution of power across the array of the pixels 112 in response to the first angle θ having the first value $θ_1$ and the coherent light having the modulation pattern. The graph 800 has a peak power value of 6 at a point on the y-axis that has a value of 2. Generally, power values at points along the y-axis have values of 4. A view (b) of FIG. 8 is a graph 802 of a distribution of power across the array of the pixels 112 in response to the first angle θ having the first value $θ_1$ and the coherent light lacking the modulation pattern. The graph 802 has a peak power value of 3 at a point on the y-axis that has a value of 2. Generally, power values at points along the y-axis have values of 2.

In an implementation, the manifold 108 can be a combination of the first alternative implementation 400 (i.e., with the defects 404) and the second alternative implementation 700 (i.e., with the cavities 704).

Figure 9:
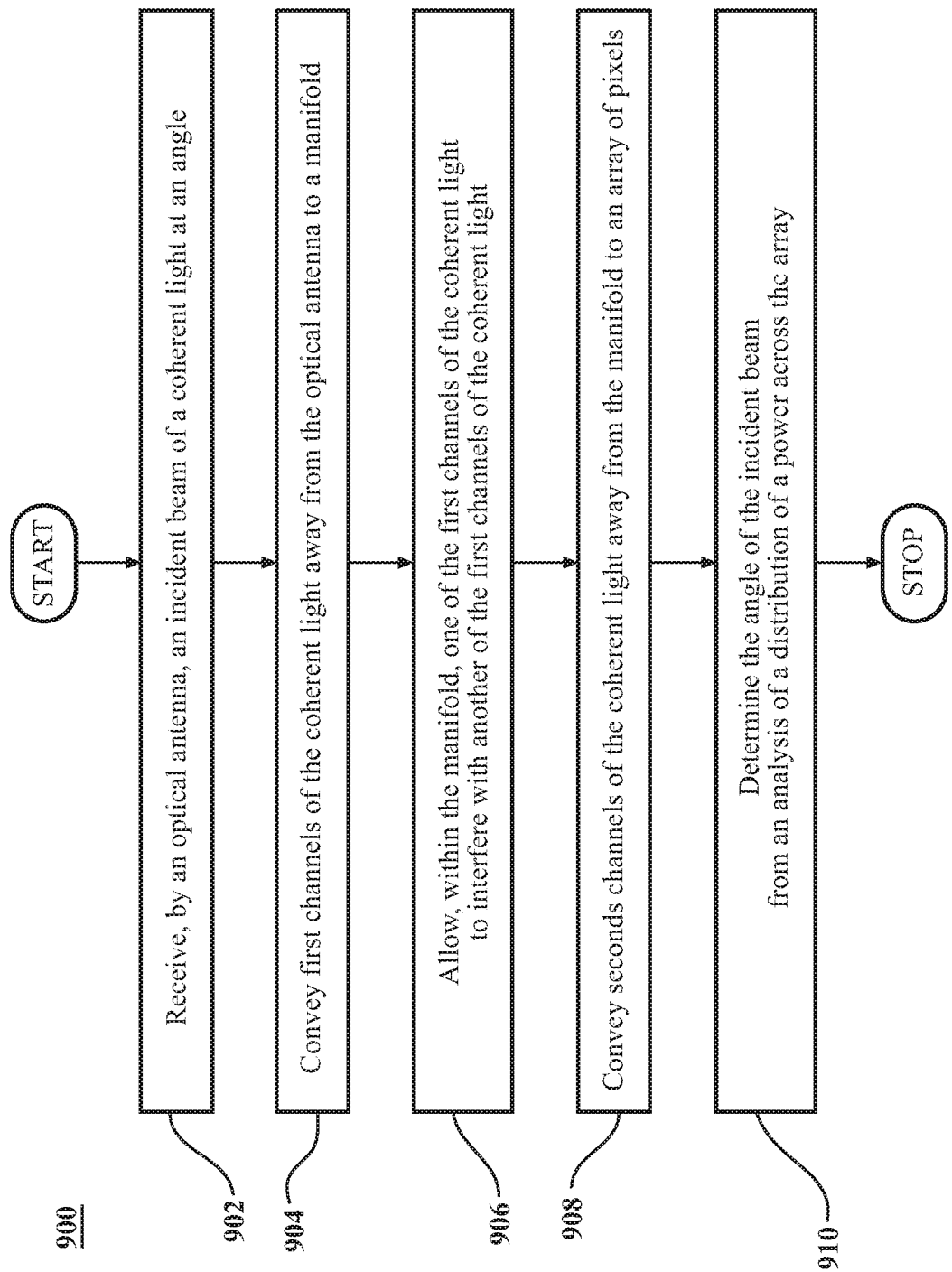
FIG. 9 is a flow diagram that illustrates an example of a method that is associated with determining the angle of the incident beam of the coherent light, according to the disclosed technologies.

FIG. 9 is a flow diagram that illustrates an example of a method 900 that is associated with determining the angle of the incident beam of the coherent light, according to the disclosed technologies. The method 900 is described from the perspective of the device 100 illustrated in FIGS. 1 and 2. Although the method 900 is described in combination with the device 100, one of skill in the art understands, in light of the description herein, that the method 900 is not limited to being implemented by the device 100. Rather, the device 100 is one example of a device that may be used to implement the method 900.

In the method 900, at an operation 902, the optical antenna 104 can receive the incident beam 102 at a first angle θ and a second angle φ. The first angle θ can be with respect to a plane defined by a surface of the optical antenna 104. The second angle φ can be with respect to a line defined by an edge of the optical antenna 104. The second angle φ can be within the plane.

At an operation 904, first channels of the coherent light can be conveyed away from the optical antenna 104 to the manifold 108. For example, the first channels can be conveyed by the first waveguides 106.

In an implementation, the optical antenna 104 can include spaced grating waveguides 120. For example, a spacing of the spaced grating waveguides 120 can be configured to cause, in response to a receipt of the incident beam 102 at the first angle θ, a phase of the coherent light in one of the first waveguides 106 to be different from a phase of the coherent light in another of the first waveguides 106.

At an operation 906, one of the first channels of the coherent light can be allowed to interfere, within the manifold 108, with another of the first channels of the coherent light.

At an operation 908, second channels of the coherent light can be conveyed away from the manifold 108 to the array of the pixels 112. For example, the second channels can be conveyed by the second waveguides 110.

At an operation 910, the first angle θ of the incident beam 102 can be determined from an analysis of a distribution of a power across the array of the pixels 112.

In an implementation, the incident beam 102 can be time multiplexed so that the coherent light is at a first wavelength $\lambda_1$ and a second wavelength $\lambda_2$. The second angle φ of the incident beam 102 can be determined based on a comparison of: (1) an analysis of the distribution of the power across the array of the pixels 112 associated with the coherent light at the first wavelength $\lambda_1$ with (2) an analysis of the distribution of the power across the array of the pixels 112 associated with the coherent light at the second wavelength $\lambda_2$.

Figure 10:
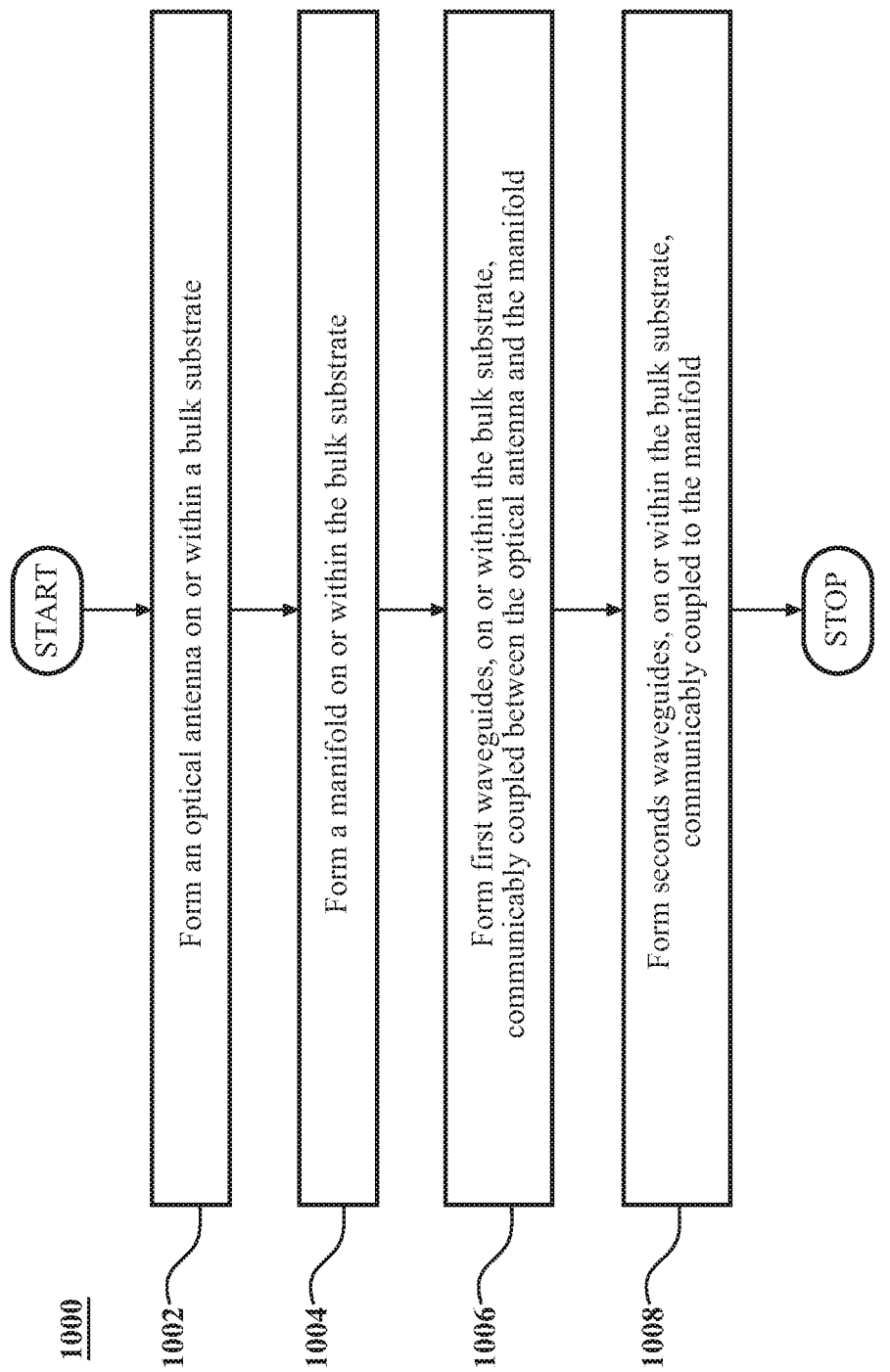
FIG. 10 is a flow diagram that illustrates an example of a method that is associated with making a device for determining the angle of the incident beam of the coherent light, according to the disclosed technologies.

FIG. 10 is a flow diagram that illustrates an example of a method 1000 that is associated with making a device for determining the angle of the incident beam of the coherent light, according to the disclosed technologies. The method 1000 is described from the perspective of the first chip 114 illustrated in FIG. 1. Although the method 1000 is described in combination with the first chip 114, one of skill in the art understands, in light of the description herein, that the method 1000 is not limited to making the first chip 114. Rather, the first chip 114 is one example of a device that may be made by the method 1000. Additionally, although the method 1000 is illustrated as a generally serial process, various aspects of the method 1000 may be able to be executed in parallel.

In the method 1000, at an operation 1002, the optical antenna 104 can be formed on or within a bulk substrate. For example, the bulk substrate can be made of silicon dioxide. For example, the optical antenna 104 can be made of silicon or silicon nitride. In an implementation, the optical antenna 104 can include spaced grating waveguides 120.

At an operation 1004, the manifold 108 can be formed on or within the bulk substrate. For example, the manifold 108 can be made of silicon or silicon nitride. In an implementation, the manifold 108 can have a rectangular prism shape. For example, the manifold 108 can be configured so that a measure of a dimension of the manifold 108 along a path of a conveyance of the coherent light is greater than or equal to a minimal measure of the dimension that allows the coherent light that emerges from one of the first waveguides 106 to interfere with the coherent light that emerges from another of the first waveguides 106.

In a first alternative implementation, the interior 402 of the manifold 108 can include the defects 404. For example, the defects 404 can be made of silicon dioxide. The defects 404 can be disposed in a pseudorandom pattern. The pseudorandom pattern can be configured to cause, in response to a receipt of the coherent light, features in the distribution of the power across the array of the pixels 112 to be magnified so that the distribution of the power across the array of the pixels 112 for the first angle θ at the first value $θ_1$ can be distinguishable from the distribution of the power across the array for the first angle θ at the second value $θ_2$.

In a second alternative implementation, the interior 702 of the manifold 108 can include the cavities 704. The cavities 704 can be disposed in a specific arrangement. The specific arrangement can be configured to cause, in response to a receipt of the coherent light that has a modulation pattern used to specifically identify a source of the coherent light, an amplification of the coherent light. Additionally, for example, the specific arrangement can be configured to prevent, in response to a receipt of the coherent light that lacks the modulation pattern used to specifically identify the source, the amplification of the coherent light.

At an operation 1006, the first waveguides 106 can be formed on or within the bulk substrate. The first waveguides 106 can be communicably coupled between the optical antenna 104 and the manifold 108. For example, the first waveguides 106 can be made of silicon or silicon nitride. In an implementation, a count of the first waveguides 106 can be a function of one or more of an antenna specification, an antenna gain, a grating lobe free scan area, or the like.

At an operation 1008, the second waveguides 110 can be formed on or within the bulk substrate. For example, the second waveguides 110 can be made of silicon or silicon nitride. The second waveguides 110 can be communicably coupled to the manifold 108. In an implementation, a count of the second waveguides 110 can be equal to a count of the pixels 112. In an implementation, the count of the second waveguides 110 can be different from the count of the first waveguides 106.

In one or more arrangements, one or more of the modules described herein can include artificial or computational intelligence elements, e.g., a neural network, fuzzy logic, or other machine learning algorithms. Furthermore, in one or more arrangements, the one or more of the modules can be distributed among a plurality of the modules described herein. In one or more arrangements, two or more of the modules described herein can be combined into a single module.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1, 2, 4, 7, 9, and 10, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for determining a first angle of an incident beam of a coherent light, the system comprising:
    an optical antenna;
    first waveguides communicably coupled to the optical antenna;
    a manifold communicably coupled to the first waveguides;
    second waveguides communicably coupled to the manifold;
    pixels communicably coupled to the second waveguides; and
    a processor,
    wherein:
        the pixels are arranged in an array and are configured to measure a power of the coherent light that emerges from the second waveguides, and
        the processor is configured to operate a neural network trained to determine the first angle of the incident beam from an analysis of a distribution of the power across the array, wherein the pixels are inputs for the neural network and the neural network is configured to be trained by causing the incident beam of the coherent light to impinge the optical antenna at a known angle.

2. The system of claim 1, wherein:
    the optical antenna, the first waveguides, the manifold, and the second waveguides are fabricated as structures on or within a bulk substrate,
    the structures are made of a material having a first refractive index,
    the bulk substrate is made of a material having a second refractive index, and
    the first refractive index is greater than the second refractive index.

3. The system of claim 1, wherein:
    the optical antenna is configured to receive the incident beam at the first angle, the first angle being with respect to a plane defined by a surface of the optical antenna, the first waveguides are configured to convey first channels of the coherent light away from the optical antenna, the manifold is configured to receive the first channels of the coherent light from the first waveguides, the second waveguides are configured to convey second channels of the coherent light away from the manifold, and the pixels are configured to receive the second channels of the coherent light from the second waveguides.

4. The system of claim 1, wherein the optical antenna comprises spaced grating waveguides, a spacing of the spaced grating waveguides being configured to cause:

a phase of the coherent light in one of the first waveguides to be different from a phase of the coherent light in another of the first waveguides.

5. The system of claim 1, wherein a count of the first waveguides is a function of at least one of an antenna specification, an antenna gain, or a grating lobe free scan area.

6. The system of claim 1, wherein the manifold has a rectangular prism shape and is configured so that, in response to a receipt of the coherent light from the first waveguides, a measure of a dimension of the manifold along a path of a conveyance of the coherent light is greater than or equal to a minimal measure of the dimension that allows the coherent light that emerges from one of the first waveguides to interfere with the coherent light that emerges from another of the first waveguides.

7. The system of claim 1, wherein a count of the second waveguides is different from a count of the first waveguides.

8. The system of claim 1, wherein the pixels are disposed on an edge of the second chip and orthogonal to a plane defined by a surface of the optical antenna.

9. The system of claim 1, wherein a pixel of the pixels is configured to measure a power of the coherent light that emerges from a corresponding second waveguide of the second waveguides.

10. The system of claim 1, wherein the processor is configured to access values in a lookup table in conjunction with a performance of the analysis.

11. The system of claim 1, wherein:

the optical antenna is configured to receive the incident beam at the first angle and at a second angle, the incident beam being time multiplexed so that the coherent light is at a first wavelength and a second wavelength, the first angle being with respect to a plane defined by a surface of the optical antenna, the second angle being with respect to a line defined by an edge of the optical antenna, the second angle being within the plane; and the processor is further configured to determine the second angle based on a comparison of:

an analysis of the distribution of the power across the array associated with the coherent light at the first wavelength with an analysis of the distribution of the power across the array associated with the coherent light at the second wavelength.

12. The system of claim 1, wherein:

the optical antenna, the first waveguides, the manifold, and the second waveguides are fabricated on a first chip, the pixels are fabricated on a second chip, and the first chip and the second chip are mounted on a printed circuit board.

13. The system of claim 12, wherein the second chip is the first chip.

14. The system of claim 1, further comprising a multiplexer communicably coupled to the pixels and communicably coupled to the processor.

15. A system for determining an angle of an incident beam of a coherent light, the system comprising:

an optical antenna;

first waveguides communicably coupled to the optical antenna;

a manifold communicably coupled to the first waveguides;

second waveguides communicably coupled to the manifold; and pixels communicably coupled to the second waveguides, wherein:

the pixels are arranged in an array and are configured to measure a power of the coherent light that emerges from the second waveguides, an interior of the manifold includes defects, the defects are disposed in a pseudorandom pattern, and the pseudorandom pattern is configured to cause, in response to a receipt of the coherent light, features in a distribution of the power across the array to be magnified so that the distribution of the power across the array for the angle at a first value is distinguishable from the distribution of the power across the array for the first angle at a second value.

16. The system of claim 15, wherein the manifold is made of silicon and the defects are made of silicon dioxide.

17. The system of claim 15, wherein:

the interior of the manifold further includes cavities, the cavities are disposed in a specific arrangement, and the specific arrangement is configured to:

cause, in response to a receipt of the coherent light that has a modulation pattern used to specifically identify a source of the coherent light, an amplification of the coherent light, and prevent, in response to a receipt of the coherent light that lacks the modulation pattern used to specifically identify the source, the amplification of the coherent light.

18. A system for determining an angle of an incident beam of a coherent light, the system comprising:

an optical antenna;

first waveguides communicably coupled to the optical antenna;

a manifold communicably coupled to the first waveguides;

second waveguides communicably coupled to the manifold; and pixels communicably coupled to the second waveguides, wherein:

an interior of the manifold includes cavities, the cavities are disposed in a specific arrangement, and the specific arrangement is configured to:

cause, in response to a receipt of the coherent light that has a modulation pattern used to specifically identify a source of the coherent light, an amplification of the coherent light, and prevent, in response to a receipt of the coherent light that lacks the modulation pattern used to specifically identify the source, the amplification of the coherent light.

19. The system of claim 18, wherein:

the source of the coherent light is a specific LIDAR system, and the modulation pattern specifically identifies the specific LIDAR system.

20. The system of claim 19, wherein:

the specific LIDAR system is included on a vehicle, and the modulation pattern specifically identifies the vehicle.

\* \* \* \* \*